3,291,720
PROCESS FOR HYDROREFINING AND HYDROCRACKING OF HYDROCARBONS WITH A RHODIUM SULFIDE SUPPORTED CATALYST
Robert M. Dobres, Silver Spring, Md., and William A. Stover, Pitman, N.J., assignors to W. R. Grace & Co., a corporation of Connecticut
Filed Jan. 14, 1964, Ser. No. 337,568
6 Claims. (Cl. 208—89)

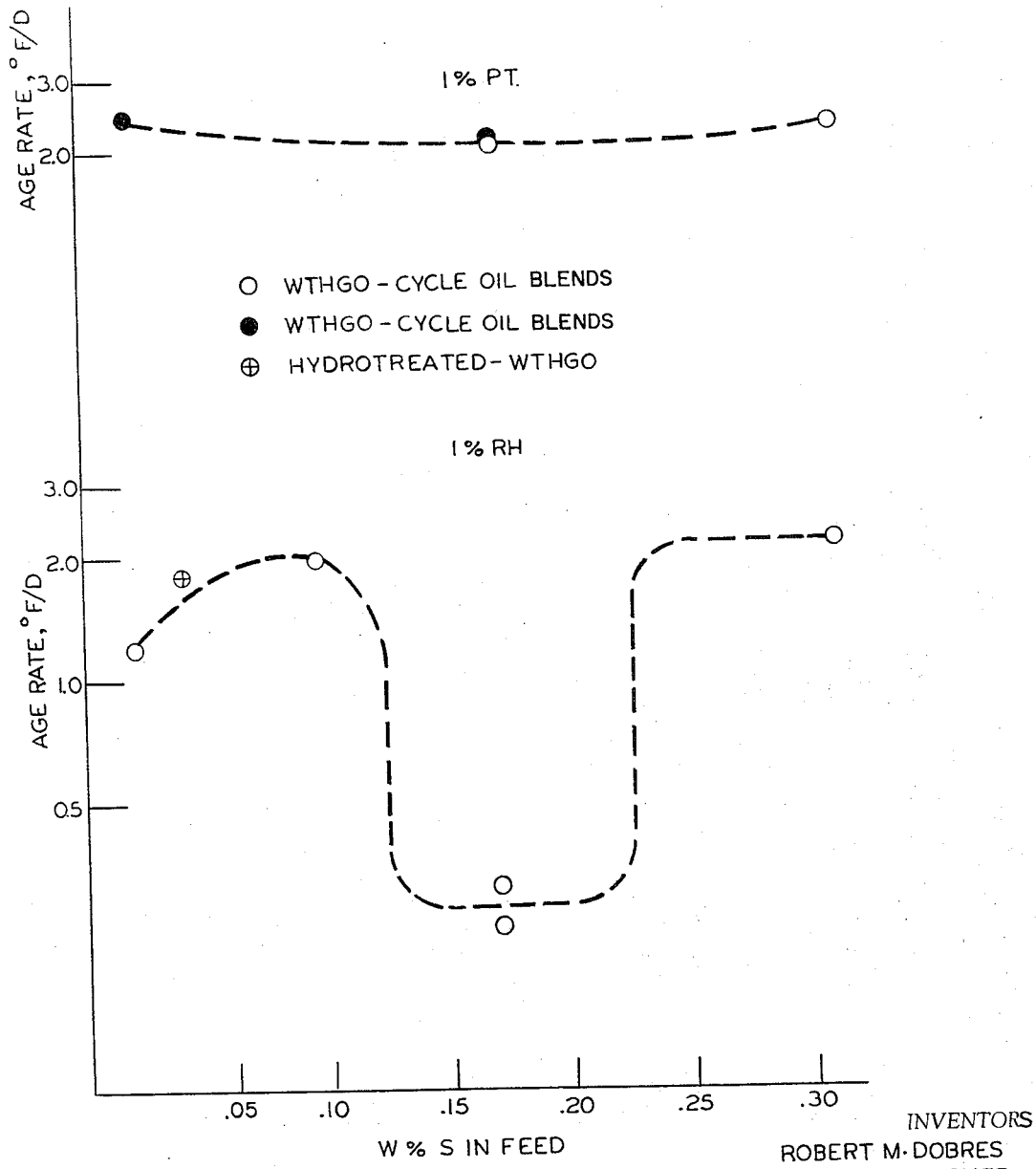
INVENTORS
ROBERT M. DOBRES
WILLIAM A. STOVER

This invention relates to the catalytic hydrocracking of hydrocarbons. It is more particularly concerned with the process whereby relatively high boiling hydrocarbons are subjected to cracking in the presence of hydrogen and supported modified rhodium sulfide catalysts, to product low boiling useful hydrocarbon products.

Hydrocracking is a well known term of art in the petroleum refining field. It relates to the operation wherein mixtures of hydrocarbon molecules having relatively high molecular weight are converted into mixtures of hydrocarbon molecules having lower molecular weight. If hydrogen is charged into the cracking operation under modified conditions of temperature and pressure, the process is known as hydrocracking. Catalytic hydrocracking is historically a relatively old process. It has recently been the subject of renewed interest and commercial acceptance in the petroleum refining industries. As the result of technical advances and changing refinery economics, the importance of the process has grown considerably in the past few years. It is currently viewed as a process in a phase of slow growth but with large potential, first as an adjunct to catalytic cracking and later as a partial replacement.

Hydrocracking has several advantages over conventional cracking processes. The conventional catalytic cracking processes are carried out at temperatures of about 800–1000° F. The disadvantages of conventional catalytic cracking are the production of relatively large amounts of coke and of low molecular weight gases (dry gas). The production of these by-products of the cracking process represents a loss in yield of desirable liquid products. The production of so-called dry gas is also disadvantageous in that it requires a very elaborate system to separate these products from the liquid products of the catalytic cracker. The production of large amounts of coke is also disadvantageous because it requires more frequent regeneration of the catalyst. In some of the conventional catalytic processes presently employed, a portion of the catalyst is constantly being regenerated due to the production of coke in the cracking process.

Hydrocracking was first commercialized in Germany in the 1920's and later in England to produce gasoline from oils derived from coal hydrogenation. As work in the field progressed, catalysts were improved and a process which could be operated at pressures of 3000–4500 p.s.i.g. was developed. The most recent commercialization of hydrocracking in the United States is based on the availability of by-product hydrogen from catalytic reforming, the development of improved catalysts which allow operation of the hydrocracking process at pressures under 2000 p.s.i.g., and the demand for premium products of selected feed stocks.

Of the four commercially available hydrocracking processes presently available for use in the United States, three are designed to refine light gas oils and cycle stocks while the fourth is applied to heavy residual stocks.

There are a number of reasons why hydrocracking is an attractive refining process. It is a continuous operation in which a fixed catalyst bed is held on stream for relatively long periods of time. In these respects, the process resembles hydrotreating and reforming which have had wide commercial acceptance. Hydrocracking can handle a wide variety of feed stocks, some of which are marginal for catalytic cracking. Its chief attraction, however, is its ability to product high yields of premium products and also its flexibility for varying gasoline and fuel oil yields to meet seasonal and short term demands.

We have developed a hydrocracking process which operates at conditions favorable for producing high yields of premium products and maintains catalytic activity at high levels in continuous operation over an extended period of time. This result is achieved through use of a rhodium sulfide catalyst composition in the system. This may be accomplished in one of two ways. A rhodium sulfide may be charged to the system initially as the catalyst or the catalyst may be prepared in situ by controlling the environmental hydrogen sulfide to hydrogen ratio in the catalytic cracking over a rhodium metal catalyst.

Our invention is based on the fact that rhodium sulfides exist with rhodium to sulphur ratios of 1:1, 1:0.75, 1:0.67 and 1:0.4. This is in contrast to the platinum sulfides which contain a platinum to sulfide ratio of only 1:1 or 1:0.5. Thus, in the rhodium sulfide system, the transition between the different rhodium sulfide species occurs by small and readily obtainable changes in hydrogen sulfide to hydrogen ratios which are sufficient to define the equilibrium composition of any given rhodium sulfide.

We have found a convenient method of preparing the desired rhodium sulfide for use in the process. By narrowly limiting the environmental hydrogen sulfide to hydrogen mole ratio with the range of $10^{-3}$ to $10^{-4}$, we can provide the proper atmosphere for maintaining a critical composition of the rhodium sulfide catalyst. Our process represents a technical advance over the use of platinum catalysts in the prior art in that the silica-alumina supported rhodium sulfide species which equilibrates in a hydrogen sulfide to hydrogen mole ratio of $10^{-3}$ to $10^{-4}$ deactivates on continuous operation at rates approaching one order of magnitude slower than the species which equilibrates outside this range.

Rhodium is known to have high hydrogenation-dehydrogenation activity and has an atomic weight of about ½ that of platinum. Thus it contains almost twice as many atoms in the same weight of metal. In addition, because rhodium has a smaller unit cell than platinum, it would be expected that rhodium would disperse on the silica-alumina surface in smaller units and provide a higher metal surface area.

The proceses of the prior art have used platinum catalysts because of the problems encountered with other available catalysts. The tungsten sulfide catalysts are a good example. These catalysts are very active initially but have lower on stream stability than is desirable for a commercial process. Unsupported tungsten sulfide is very active but it also ages very rapidly. Other sulfide catalysts, such as nickel-tungsten sulfide, are less active but also age rapidly. These disadvantages have led to the use of platinum as an active hydrocracking catalyst component. A platinum catalyst containing 0.5% by weight of metal supported on an active silica-alumina base undergoes serious decline in activity and in on-stream stability after several regenerations of the coke laden catalyst at 900°F. in oxygen.

Some improvement in activity and age rate, as well as regeneration stability, can be obtained by increasing the platinum content, to, for example, 1 weight percent. This yields a catalyst which has improved regeneration stability. However, in all cases of supported platinum catalysts the crystallite size of the metal increases during regeneration. This decreases the activity of the metal component which adversely affects catalyst activity maintenance.

The rhodium sulfide catalyst supported, for example, on a silica-alumina base is a technical advance over the platinum catalyst of the prior art in that, at a comparable metal content it has a much improved activity maintenance. After regeneration of the coked catalyst, the activity remains virtualy constant. There is no detectable crystallite rhodium found in the catalyst even after ten regeneration cycles. Thus the rhodium sulfide catalyst of our invention is superior to the platinum catalyst and the tungsten sulfide catalyst of the prior art.

We prefer to use a silica-alumina support for our catalysts. However, other supports also give satisfactory results. The preferred supports for the catalyst in the process of the present invention are synthetic composites of two or more refractory oxides. An important limitation is that the catalyst base must have an activity index (D+L) of at least 40 in order to achieve effective cracking and production of only small amounts of dry gas. Examples of suitable catalyst supports include the preferred silica-alumina in either the amorphous or crystalline zeolite form, silica-zirconia, silica-alumina-zirconia, silica-alumina-thoria, alumina-boria, alumina-fluoride, silica-magnesia-fluoride, silica-alumina-magnesia, silica-alumina-fluoride, and the like. The preferred catalyst support is a synthetic composite of silica and alumina which contain 13 to 45% alumina coordinated in active form with silica. The support containing higher active alumina is particularly desirable because of its higher demonstrated stability in commercial cracking units.

There is nothing critical about the manner in which the carrier is prepared. They can be made by any usual method well known to those skilled in the catalyst art. A suitable method of preparation of these supports is described in U.S. Patent 2,886,512 issued May 12, 1959.

Briefly, the method described in this patent is as follows:

A solution of sodium silicate is prepared. The silicate is converted to a hydrogel and gelled by the addition of gaseous carbon dioxide which converts the sodium hydroxide present in the silicate to sodium carbonate. The active alumina is supplied by the addition of a salt of aluminum in a quantity sufficient to provide the desired percentage of active alumina in the final catalyst. The preferred aluminum salt is aluminum sulfate. The addition of the aluminum salt results in the removal and evolution of carbon dioxide gas which is recycled to the first step of the process. The change of pH in the system causes alumina to form and react with silica hydrogel. The composite is washed and dried using the conventional techniques.

The rhodium catalyst may be prepared by impregnating this base with a rhodium solution such as the solution of the chloride, for example. The rhodium sulfide catalyst may then be prepared in situ. An alternate method of preparing the catalyst is to prepare a rhodium sulfide sol and impregnate the catalyst with this sol. In this technique, the rhodium sulfide is prepared separately and the base impregnated with the prepared sulfide. The amount of rhodium deposited on the carrier should be in the range of about 0.1 to about 5%. Since the composition of rhodium sulfide is critical, the rhodium to sulphur atomic ratio in the final catalyst should be in the range of 0.6 to 0.8. The critically important range of sulfide can be obtained by limiting the $H_2S$ to hydrogen environment to within the molar ratio of $10^{-3}$ to $10^{-4}$. This can be obtained, for example, by using a feed containing about 0.17 weight percent sulphur which is convertible in the process to hydrogen sulfide and a mole ratio of $H_2$ to oil about 40:1.

The invention is further illustrated by the following specific but non-limiting examples.

*Example I*

The following example illustrates the discovery of a unique rhodium sulfide catalyst, the surface composition of which is controlled within narrow limits by maintaining over it a critical environmental ratio of $H_2S$ to $H_2$. In this example, the partial pressure of $H_2S$ in the reaction system is varied through changes in the sulphur content of the oil feed. The feed stock used in this example consisted of:

(1) A heavy gas oil, boiling range 640 to 940° F., 27.4° A.P.I. gravity, containing 0.3% combined sulphur.

(2) A hydrocracked cycle stock, boiling range 390 to 913° F., 35.0° A.P.I. gravity, containing 0.02% combined sulphur.

(3) Mixtures of these two oils.

(4) A hydrotreated heavy gas oil, boiling range 429 to 957° F., 28.4° A.P.I. gravity, containing 0.04% sulphur.

The hydrocracking runs to be described were carried out at a pressure of 1500 p.s.i.g. an $H_2$ to oil mole ratio of 40, a liquid hourly space velocity of 0.5 and at temperatures required to effect conversion of 50 to 60 volume percent to products boiling below 390° F. At those conditions the combined sulphur of the feed is over 90% desulphurized to $H_2S$ providing with these feed stocks, a variation of $H_2S$ to $H_2$ mole ratio over the range $4.5 \times 10^{-5}$ to $10^{-3}$.

A consecutive series of hydrocracking runs was carried out varying only the composition of the feed stocks described above. The catalyst was a rhodium-silica-alumina composition containing 1 weight percent rhodium. Each run in the series lasted at least 100 hours in order to establish the steady state rate at which the catalyst aged. The catalyst aging rate is defined and determined experimentally as the daily increase in temperature requires to maintain a constant level of conversion. It is the slope of the curve relating reaction temperature versus time on stream, measured and recorded at three hour intervals.

The 1% rhodium-silica-alumina catalyst was brought on stream and lined out on a West Texas heavy gas oil (WTHGO) containing 0.3% sulphur and furnishing a mole ratio of $H_2S$ to $H_2=10^{-3}$. The steady state aging rate was determined to be 2.2° F. per day at the previously described hydrocracking conditions.

The feed stream was then switched in the second run to a 50:50 blend of West Texas heavy gas oil and a hydrocracked cycle stock. The blend contained 0.17% sulphur furnishing an $H_2S$ to $H_2$ mole ratio of $5 \times 10^{-4}$. The steady state aging rate, measured over a period of 245 to 405 hours, was only 0.31° F. per day, one-seventh the value produced by the West Texas heavy gas oil containing 0.3% sulphur. This very low rate of catalyst aging was then checked by a second measurement extending to 570 hours on stream. A value of 0.25° F. per day was obtained, verifying the initial observation of a very low aging rate with this blended feed mixture.

In the third run of the sequence, a feed mixture containing 25% West Texas heavy gas oil and 75% hydrocracked cycle stock was charged over the catalyst. This blend contained 0.095% sulphur and yielded an $H_2S$ to $H_2$ mole ratio of $2.3 \times 10^{-4}$. The age rate, measured over the interval 585 to 735 hours, was 2.0° F. per day. This run showed that the catalyst aging rate had passed through a minimum at a critical feed composition containing 0.17% sulphur in the second run.

The fourth run in the series utilized pure hydrocracked cycle stock containing 0.02% sulphur. The $H_2S$ to $H_2$ ratio was $4.5 \times 10^{-5}$. The rate of catalyst aging, measured over the interval of 760 to 925 hours, was 1.2° F. per day. It should be noted that this aging rate is four to five times higher than that obtained with the blended feed in the second run even though the low sulphur pure cycle oil is less refractory, i.e. requires lower temperature for the same conversion.

It was also established in a separate run that reducing the sulphur content of the reference West Texas heavy gas oil from 0.31 to 0.04 weight percent by hydrotreating had very little effect on the aging characteristics of the rhodium catalyst. The steady state age rate with the hydrotreated oil was determined to be 1.8° F. per day in a run lasting 130 hours. This result is very similar to that obtained with another sample of hydrocracked cycle oil which is lower boiling and less refractory than the hydrotreated gas oil.

These results show that the failure of the very low sulphur cycle oils and hydrotreated oils to age at rates comparable to the very low rates obtained with the aforementioned blend of heavy gas oil and hydrocracked cycle oil is due to a deficiency of reducible sulphur in the feed. To obtain a minimum aging rate in gas oil hydrocracking with a 1% supported rhodium catalyst, these data show that the reducible sulphur content of the feed must be greater than 0.10 weight percent and less than 0.30 weight percent. In more fundamental form, the critical requirement can be stated as limiting the $H_2S$ to $H_2$ mole ratio as greater than $2\times10^{-4}$ and less than $10^{-3}$. These results are shown graphically in the figure.

*Example II*

This example illustrates a preferred method for preparing the catalyst used in the process of instant application. The base for this catalyst was prepared as follows:

Fourteen pounds of carbon dioxide gas was bubbled through 960 pounds of a 6.4° Bé. sodium silicate solution ($SiO_2:Na_2O$ weight ratio equal to 3.2:1) originally at 114° F., with continued agitation. The amount of carbon dioxide added was sufficient to neutralize 75% of the $Na_2O$ present. A silica hydrogel formed and the addition of carbon dioxide was then suspended. The hydrogel was found to contain 4.7% $SiO_2$ and the reaction mixture had a pH of 10.0 The hydrogel was aged with continued agitation for a period of 45 minutes, after which 100 pounds of an aluminum sulfate solution containing 6.6% $Al_2O_3$ and about 1 weight percent sulfuric acid was added. Carbon dioxide was evolved. Following the aluminum sulfate addition, the resulting silica-alumina composite (pH 5.5) was aged for a period of about 15 minutes. Following aging, the material was filtered, washed and dried in a conventional manner to form the final catalyst base.

A total of 220 grams of the catalyst base, prepared as described above and having a mesh size of 14-24 mesh was transferred to a vacuum flask. A separatory funnel containing 280 ml. of impregnating solution containing 2.2225 grams of rhodium as rhodium nitrate was placed above the vacuum flask. The flask was then evacuated and recharged with $CO_2$ three successive times. After the fourth evacuation, the impregnating solution was added to the base and the mixture was agitated using a shaker. The impregnating solution was added to the base for a period of five minutes and the mixture was agitated for a period of ten minutes to give an even impregnation. The catalyst was dried overnight at 230° F. and then dried two additional hours in an evaporating dish, in a force draft oven. The catalyst was reduced in a hydrogen atmosphere in a reduction unit. The reduction was carried out by first heating the unit and the catalyst to 450° F. in an atmosphere of nitrogen. Hydrogen was substituted for the nitrogen atmosphere and temperature maintained for a period of two hours. At the end of this time, the temperature was increased to 950° F. and maintained at this temperature for an additional two hours. The unit was cooled overnight in an atmosphere of nitrogen and the catalyst is discharged. The nitrogen and hydrogen gases were flowed through the unit at a rate of 2–5 volumes of gas per volume of catalyst per hour. The physical and chemical properties of the catalyst are set out in Table I below:

TABLE I

| | |
|---|---|
| Weight percent rhodium | 1.0 |
| Physical properties: | |
| Surface area in m²./g. | 404 |
| Pore volume in cc./g. | 0.46 |
| Pore diameter in °A.= | 46 |
| Average particle size, mesh | 14–16 |

Obviously many modifications and variations to the invention may be made without departing from the essence and scope thereof and only such limitations should be applied as are indicated in the appended claims.

What is claimed is:

1. A process for conversion of hydrocarbons which comprises the steps of hydrocracking a hydrocarbon feed having a boiling range of about 400° F. to 1000° F. in the presence of a hydrocracking catalyst containing about 0.5 to 5 percent rhodium sulfide wherein the rhodium to sulfide atomic ratio is maintained at 0.5 to 0.9, employing temperatures of from 500 to 900° F., a pressure of 800 to 2000 p.s.i.g., a liquid hourly space velocity of total hydrocarbon feed from 0.5 to 5 and a ratio of hydrogen to hydrocarbon of 20 to 60, separating a heavy fraction from the effluent and recycling the same as a part of said total feed to the first mentioned hydrocracking step.

2. A process for conversion of hydrocarbons which comprises the steps of hydrocracking a hydrocarbon feed having a boiling range of about 400 to 1000° F. in the presence of a hydrocracking catalyst containing about 0.5 to 5 percent rhodium sulfide wherein the rohdium to sulphur atomic ratio is 0.6 to 0.8 employing temperatures from 500 to 900° F. and a pressure of 800 to 1600 p.s.i.g., a liquid hourly space velocity of total hydrocarbon feed from 0.5 to 5 and a ratio of hydrogen to hydrocarbon of 30 to 50, separating a heavy fraction from the effluent and recycling same as a part of the said total feed to the first mentioned hydrocracking step.

3. A process for the conversion of hydrocarbons which comprises the steps of hydrocracking a hydrocarbon feed having a boiling range of about 400 to 1000° F. in the presence of about 0.5 to 5 percent rhodium at a temperature of from 500 to 900° F., a pressure of 800 to 1600 p.s.i.g., a liquid hourly space velocity of total hydrocarbon feed from 0.5 to 5, and a ratio of hydrogen to hydrocarbon of 30 to 60, said reaction conditions being controlled so that the hydrogen sulfide to hydrogen mole ratio is within the range of $10^{-3}$ to $10^{-4}$, separating a heavy fraction from the effluent and recycling the same as a part of said total feed to the first mentioned hydrocracking step.

4. A process for the conversion of hydrocarbons which comprises the steps of hydrocracking a hydrocarbon feed having a boiling range of about 400 to 1000° F., and containing about 0.17 weight percent reducible sulphur in the presence of a hydrocracking catalyst containing about .5 to 5 percent rhodium at a temperature of 600 to 900° F., a pressure of 800 to 1600 p.s.i.g., a liquid hourly space velocity of total hydrocarbon feed from 0.5 to 5, and a ratio of hydrogen to hydrocarbon of 30 to 60, said reaction conditions being controlled so that the hydrogen sulfide to hydrogen atomic ratio is within the range of $10^{-3}$ to $10^{-4}$, separating a heavy fraction from the effluent and recycling the same as part of said total feed to the first mentioned hydrocracking step.

5. A process for the conversion of hydrocarbons which comprises the steps of hydrocracking a hydrocarbon feed having a boiling range of 400 to 1000° F., subjecting feed stock to a hydrotreating step to reduce the nitrogen and sulphur content thereof, carrying out said conversion in the presence of a hydrocracking catalyst containing about 0.5 to 5% rhodium sulfide wherein the rhodium to sulfide ratio is maintained at 0.5 to 0.9 employing temperatures of from 400 to 700° F., a pressure of 800 to 2000 p.s.i.g., a liquid hourly space velocity of total hydrocarbon feed from 0.5 to 5 and a ratio of hydrogen to hydrocarbon of 30 to 60, separating a heavy fraction from the effluent and recycling the same as a part of said total feed to the first mentioned hydrocracking step.

6. A process for the conversion of hydrocarbons which comprises the steps of hydrocracking a hydrocarbon feed having a boiling range of about 400 to 1000° F., subjecting said feed stock to prior hydrotreating step to reduce the nitrogen and sulphur content of said feed, said conversion being carried out in the presence of a hydrocracking catalyst containing about 0.5 to 5% rhodium at a temperature of from 400 to 700° F., a pressure of 800 to 1600 p.s.i.g., a liquid hourly space velocity of total hydrocarbon feed from 0.5 to 5, and a ratio of hydrogen to hydrocarbon of 30 to 60, said reaction conditions being controlled so that the hydrogen sulfide to hydrogen mole ratio is within the range of $10^{-3}$ to $10^{-4}$, separating a heavy fraction from the effluent and recycling the same as a part of said total feed to the first mentioned hydrocracking step.

References Cited by the Examiner
UNITED STATES PATENTS 3,132,090    5/1964    Helfrey et al. _____ 208—110

DELBERT E. GANTZ, *Primary Examiner.*

A. RIMENS, *Assistant Examiner.*